United States Patent
Tate

[11] Patent Number: 5,824,159
[45] Date of Patent: Oct. 20, 1998

[54] PROCESS FOR TREATING SURFACE STORED CONTAMINATED SOLIDS

[75] Inventor: Robert D. Tate, Lafayette, La.

[73] Assignee: Ambar, Inc., Houston, Tex.

[21] Appl. No.: 618,393

[22] Filed: Mar. 19, 1996

Related U.S. Application Data

[63] Continuation-in-part of Ser. No. 282,875, Jul. 29, 1994, abandoned.

[51] Int. Cl.⁶ .................................. B08B 3/04; B08B 7/00
[52] U.S. Cl. ............................... 134/3; 134/10; 134/25.1; 134/28; 134/40
[58] Field of Search .................... 134/2, 3, 25.1, 134/26, 40, 28, 10; 588/1

[56] References Cited

U.S. PATENT DOCUMENTS

| | | | |
|---|---|---|---|
| 3,984,362 | 10/1976 | Sirianni et al. | 260/17.5 |
| 4,030,548 | 6/1977 | Richardson et al. | 166/279 |
| 4,215,000 | 7/1980 | De Jong et al. | 252/8.55 B |
| 4,288,333 | 9/1981 | van Zon et al. | 252/8.55 B |
| 4,708,805 | 11/1987 | D'Muhala | 210/698 |
| 4,710,303 | 12/1987 | Emmons | 210/698 |
| 4,898,677 | 2/1990 | Brase | 210/710 |
| 4,973,201 | 11/1990 | Paul et al. | 405/264 |
| 4,980,077 | 12/1990 | Morris et al. | 252/82 |
| 4,992,182 | 2/1991 | Kalfayan et al. | 252/8.55 B |
| 5,026,481 | 6/1991 | Paul et al. | 210/638 |
| 5,032,280 | 7/1991 | Paul et al. | 210/643 |
| 5,049,297 | 9/1991 | Morris et al. | 252/80 |
| 5,051,197 | 9/1991 | Kalfayan et al. | 252/8.55 B |
| 5,059,333 | 10/1991 | Hen | 252/8.552 |
| 5,084,105 | 1/1992 | Morris et al. | 134/3 |
| 5,085,709 | 2/1992 | Morris et al. | 134/3 |
| 5,087,371 | 2/1992 | Paul et al. | 252/82 |
| 5,111,887 | 5/1992 | Morris et al. | 166/312 |
| 5,116,513 | 5/1992 | Koskan et al. | 210/698 |
| 5,146,988 | 9/1992 | Paul | 166/312 |
| 5,151,196 | 9/1992 | Paul et al. | 210/712 |
| 5,183,112 | 2/1993 | Paul et al. | 166/312 |
| 5,190,656 | 3/1993 | Paul et al. | 210/643 |
| 5,200,117 | 4/1993 | Morris et al. | 252/626 |
| 5,234,602 | 8/1993 | Morris et al. | 210/698 |
| 5,256,253 | 10/1993 | Zidovec et al. | 162/164.6 |
| 5,259,980 | 11/1993 | Morris et al. | 252/82 |
| 5,282,995 | 2/1994 | Paul et al. | 252/80 |
| 5,304,704 | 4/1994 | Kammeraad | 588/249 |
| 5,444,078 | 8/1995 | Yu et al. | 514/372 |

*Primary Examiner*—Jill Warden
*Assistant Examiner*—Saeed T. Chaudhry
*Attorney, Agent, or Firm*—Arnold, White & Durkee

[57] ABSTRACT

Apparatus and method for treating solids contaminated by alkaline earth metal scales which have naturally occurring radioactive material entrained throughout the scale. The equipment and method of the present invention may be used on site to clean stored contaminated solids so that as a result of the treatment the solids may be disposed of as non-hazardous oil field waste and the radioactive isotopes may be dispersed in aqueous solution. The apparatus and method of the invention provide for placing contaminated solids and a treatment fluid in a fluid contact zone which is designed to provide optimum chemical activity for treating the contaminating scale so as to release the radioactive isotopes into solution. Once the release of the isotopes is complete to a target level of radioactivity, the treating fluid is then separated from the solids which are then reduced to non-hazardous oil field waste.

5 Claims, 13 Drawing Sheets

PROCESS FOR TREATING SURFACE STORED CONTAMINATED SOLIDS

This application is a continuation-in-part of application Ser. No. 08/282,875, filed Jul. 29, 1994 now abandoned.

BACKGROUND OF THE INVENTION

Scales are a problem in the production of oil. Effluents, such as water containing alkaline earth metal cations, such as barium, strontium, calcium, and magnesium, along with anions, such as sulfate, bicarbonate and carbonate, are often encountered in producing fields. When combinations of these anions and cations are present in sufficient concentrations, precipitation occurs, forming water insoluble scales. These water insoluble scales are otherwise known as alkaline earth metal scales. Some alkaline earth metal scales are calcium carbonate, barium sulfate, and strontium sulfate.

While some scales are amenable to acid treatment, such as hydrochloric acid and hydrofluoric acid (otherwise known as "mud acid"), other scales such as barium sulfate and strontium sulfate are difficult, to impossible to dissolve or break up. These scales can precipitate out in a variety of places, such as in the reservoir, or producing formation, of a production well. They may form in the tubulars of a production well, as well as in pipelines, heater treaters, or other equipment downstream from the wellhead. Scales may also form in injection wells, in water flood plants, in filters, or anywhere various waters come together.

While alkaline earth metal scales have been problematic in oil production, radioactive scales have become a very expensive problem. Naturally occurring radioactive material, ("NORM") such as the radium isotopes 226 and 228, have a strong affinity for these scales. As scale begins to form on tubing, as well as on produced sand or other particles in the well, the radium isotopes 226 and 228 become entrained within the scale matrix. Therefore, produced or removed solids from wells may exceed radiation levels set forth by EPA for disposal of non-hazardous oil field waste ("NOW"), or regulations set by state regulatory agencies.

While natural production of water and fluids from a well bore contain the radium isotopes 226 and 228, these isotopes are generally so diluted in the fluids that there is never a radiation problem. Radiation only becomes a problem when these radium isotopes become concentrated as in scale deposits. Such radium-entrained scales may be classified as radioactive solids if the radiation levels emitted by the scale exceeds acceptable EPA or state regulatory standards. Currently, oil production companies and others have large inventories of such solids containing alkaline earth metal scales with NORM entrained throughout. Because scales such as barium or strontium sulfate are so difficult to treat, the traditional means of cleaning tubular, pipelines, heater treaters, etc. has been to physically remove the scales. However, upon removal of the scale, the operator may have large volumes of solids contaminated with radioactive material. Presently, the companies must dispose of these solids through hazardous waste disposal sites where they are charged by the drum for disposal. Various methods are available commercially from companies that attempt to separate non-excessively radioactive, therefore non-hazardous, solids from the overall excessively radioactive collection of solids. However, those procedures do nothing to eliminate hazardous waste, but rather attempt to reduce the total volume of solids classified as hazardous waste so that the companies holding the contaminated solids will not have to pay to dispose of non-hazardous oil field waste materials.

What is needed is a process which facilitates dissolution and removal of the alkaline earth metal scales so that the radium isotopes are released back into solution and the produced or removed solids, such as sand and other material, will become non-hazardous oil field waste which simply may be disposed.

SUMMARY OF THE INVENTION

The present invention provides equipment and a method for removing alkaline earth metal scales, particularly barium sulfate and strontium sulfate, more particularly, barium sulfate, from solids classified as hazardous waste as a result of radioactivity due to entrained NORM.

The method of the present invention can be performed on site wherever hazardous waste solids containing alkaline earth metal scales are stored. The procedure of the present invention comprises contacting the solid material containing the scales with a chemical solution which will dissolve, chelate, reform, or otherwise cause the scale to release any entrained radioactive isotopes into the aqueous solution. Once the entrained radioactive isotopes have been released, the solids are separated from the aqueous solution. The solids may then be disposed of as non-hazardous oil field waste. The aqueous solution itself then contains the radium isotopes. However, because of dispersion in the aqueous solution, the radium isotopes are generally not concentrated enough to cause the aqueous solution to be classified as hazardous material under EPA or other state regulatory agency regulations. Therefore, the aqueous solution can be used to treat more solids, regenerated and used in downhole operations, or be disposed through standard procedures used by the operator to dispose of fluids used in their operation.

DETAILED DESCRIPTION OF THE INVENTION

To perform the process of the present invention, the first step requires taking the contaminated solids from their storage compartments and placing those contaminated solids in a fluid contact zone. The solid transfer mechanism may comprise any number of elements, including, but not limited to, an auger or conveyor belt system which draws solids from the bottom of a container into the fluid contact zone. A preferred embodiment would be to have the solids containers designed such that the solids transfer mechanism would be part of the container and would transfer the solids directly from a hatch in the container to the fluid contact zone.

The fluid contact zone is where the contaminated solids mix with the chemical solution that will dissolve, chelate, break-up, transform, etc. the alkaline earth metal scale in such a way as to release the radium isotopes entrained in that scale. The chemical solution may be added to the fluid contact zone either before or after the solids are added. The fluid contact zone is designed in such a way that the fluid and solids contained therein will be sufficiently agitated so that the solids will remain suspended in the fluid until the agitation has ceased. The suspension and agitation of the solids ensures that the maximum amount of surface area of the solids is in contact with fresh treating fluid at all times.

Figure 1:
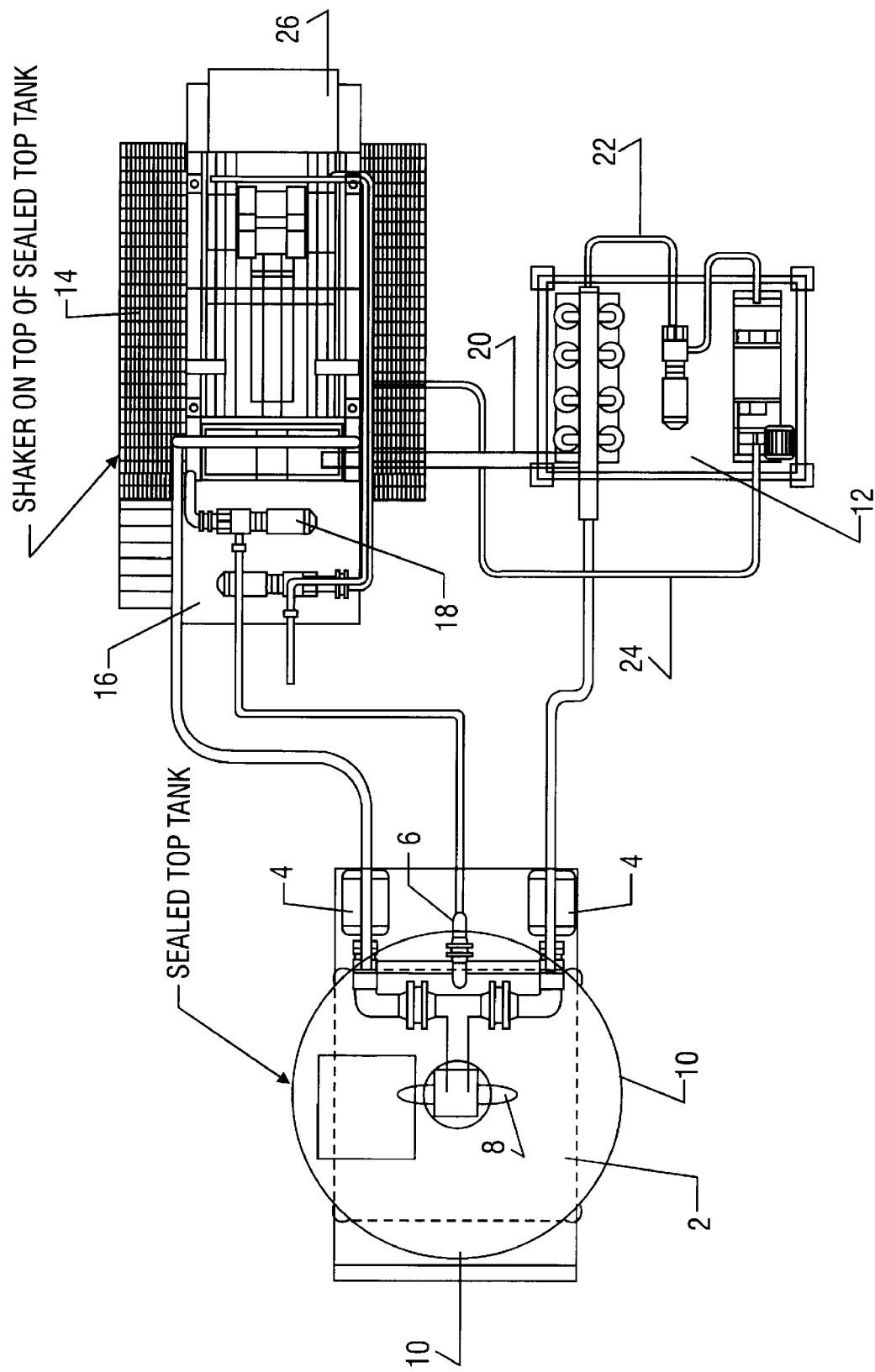
FIG. 1 is a sketch of a preferred embodiment of the apparatus of the present invention which may be used to perform the process of the present invention.

In the preferred embodiment shown in FIG. 1, the fluid contact zone is a mixing tank 2. The agitation means in the preferred embodiment comprises a standard rotating baffle 8 of the mixing tank in addition to a series of fluid jets 10 which force fluid in a direction opposite the rotation path of the baffle 8. Therefore, the fluid and solids in the mixing tank 2 of the preferred embodiment are constantly agitated so that the solids will not settle out. Any number of apparatus could accomplish the function of the fluid contact zone. For example, a vat which has air constantly forced from the bottom to the top of the vat or a mixing tank with two mechanical stirrers working in opposite directions would also be suitable for use as the fluid contact zone mechanism.

Associated with the fluid contact zone are other apparatus. First, the fluid contact zone is associated with a shearing mechanism. The shearing mechanism is designed to break up clumps of contaminated solids into particles that are as small as possible so that treating fluid can contact as much surface area of the scale and contaminated solids as possible. In the preferred embodiment shown in FIG. 1, the shearing mechanism comprises two hard-faced pumps 4 which intake the fluid and suspended solids from the mixing tank 2 and force that fluid with its suspended solids through the pumps 4. The pumping action shears the particles of solids and then forces the fluid and suspended solids back into the fluid contact zone which in the preferred embodiment is the mixing tank 2 through the jets 10. This preferred embodiment uses hard-faced pumps simply because much of the produced solids is sand and unless hard-faced surfaces are used within the pumping system or other shearing mechanism, the metal of those mechanisms could be cut out by the sand. For other contaminated solids where the abrasive quality is limited, this extra precaution may not be necessary. Another possible shearing mechanism is a system which forces the fluid and solids through jets directly into a hard face so that both pressure and physical contact are used to break up the solid agglomerations.

In addition to a shearing mechanism, the fluid contact zone is also associated with a system which can maintain the temperature of the treating solution at a temperature which promotes the optimum chemical reaction. In a preferred embodiment shown in FIG. 1, the heating system is provided by an auxiliary tank 16 which has heating elements which heat the treating fluid to between about 150° F. to about 200° F. Transfer pumps 18 transfer the heated fluid back into the fluid contact zone, while the pumps 4, which is the shearing mechanism of the preferred embodiment are valved so that they periodically transfer cooled fluid from the fluid contact zone to the heating system. In the preferred embodiment shown in FIG. 1, the mixing tank 2 is insulated to further help maintain the temperature of the fluid in the fluid contact zone. As will be appreciated by those skilled in the art, any number of heating mechanisms may be used including using internal heating elements inside the fluid contact zone itself, or in-line heaters which are capable of reheating fluid returning into the tank from the shearing mechanism.

Finally, the fluid contact zone provides a sampling system to allow samples to be drawn of the fluid and suspended solids so that the solids may be tested to determine if a sufficient amount of the radioactive isotopes have been released into the fluid. In the preferred embodiment shown in FIG. 1 a sampling port 6 is provided into the mixing tank so that samples may be drawn directly out of the tank. However, any means of sampling including sending a person to the top of the tank to dip in to take a sample of the fluid and suspended solids will suffice.

Once sampling has indicated that the solids have been cleaned sufficiently to reduce the radioactivity of those solids to whatever target value the debris owner sets, the solids then need to be separated from the treating fluid using a solids separation mechanism. The target value of radiation may be anything from zero microRoentgens per hour ($\mu R$/hr), to background, to something higher than background, whatever the operator sets. However, the cleaner the solids need to be, the longer the process will take.

The solids separation mechanism is used to separate the solids while retrieving the treating fluid so that the fluid may either be used in further treatments or disposed of separately. In the preferred embodiment of FIG. 1, the solids are separated in two stages. First, once the decision is made that the solids are sufficiently clean, the agitation mechanisms of the mixing tank 2 are shut down so that the solids may settle to the bottom of the tank. In the preferred embodiment of FIG. 1, the mixing tank 2 has a cone shaped bottom to force the solids down to the bottom so that they can be removed using the pumps 4 which make up the shearing mechanism in FIG. 1. One of the pumps 4 pumps the solids and fluids over to a hydrocyclization unit 12. The hydrocyclization unit performs an initial separation of fluids and solids, forcing the solids out through the pipe 20 and the fluids transfer through the pipe 22 to pumps which will then transfer the fluid through pipe 24 back into the auxiliary heating tank 16.

The solids in pipe 20 of FIG. 1 are still substantially mixed with some fluid. To further separate the solids, the preferred embodiment shown in FIG. 1 uses a standard high-speed shale shaker 14, which is typically used in drilling operations, to separate fluids and solids. The wet solids are placed on the shaker mechanism 14 which has elements which vibrate the wet solids so that the fluids drop through the grating and the solids move forward to a solids receiving bin 26 where the now non-hazardous oil field waste solids may be collected for disposal in whatever means the operator chooses. The fluid that drops through the grating in the shaker 14 is returned to the auxiliary heating tank 16. From the auxiliary heating tank 16, the fluid may be returned to the fluid contact zone which in the preferred embodiment is the mixing tank 2. As will be understood by one skilled in the art, the fluid from either the hydrocyclization unit 12 or the shaker 14 may be returned directly to the fluid contact zone mixing tank 2 or any other place where the used treating fluid is being collected. In addition, use of only one of the above solid separation mechanisms, or the use of other mechanisms, such as filtration systems or even a settling tank, would all be useful in the present invention to separate the solids from the liquid effluent.

Once all the solids and fluids have been separated and the fluids re-collected in the fluid contact zone, the fluid, if not spent, may then be used to treat more contaminated solids. Otherwise, the fluid may be drained out of the fluid contact zone and disposed of as non-hazardous oil field waste.

The treatment fluid used in the present invention may comprise any chemical which will dissolve, chelate, reform, break up or otherwise treat alkaline earth metal scales such that the entrained radium isotopes are released. For example, U.S. Pat. Nos. 5,200,117 and 5,049,297, describe chemicals that are somewhat effective in dissolving alkaline earth metal scales. However, the preferred chemicals for use in this process are the AMBASOL family of scale treatment chemicals available from Ambar Inc. located in Lafayette, La. The AMBASOL chemical family has a basic makeup of a polyaminocarboxylic acid, a potassium base, water, a pH stabilizer in the form of a potassium salt, a synergist comprised of a hydroxycarboxylic acid or salt thereof, and a wetting agent comprising methanol and sodium chloride. Preferred embodiments and specific volume fractions of each product are described in detail in a copending application of applicant Ser. No. 08/282,883 filed Jul. 29, 1994, with Robert D. Tate as named inventor and the title being "Compound for Removing Scale," Said copending application is incorporated by reference in its entirety.

The choice of treatment fluid will depend on the particular type of scale to be treated. To determine the most effective treatment fluid or even combination of treatment fluids, the contaminated solids may be lab-tested to determine the percentage and type of scale present. For example, with the AMBASOL products if the solids to be treated are coated with paraffin, or the scale contains potassium fluorosilicate, the AMBASOL KFL product which includes a sodium base such as sodium hydroxide in with the basic solution described above may be used. For barium or strontium sulfate the basic AMBASOL product may be used. For the composition described in said copending application, it is preferred that the synergist be hydroxycarboxylic acid or salt thereof; it is further preferred that the synergist be sodium glucoheptonate, which has been rendered "optically inactive" by selectively removing the "A" and "B" isomers. The treating fluid should be diluted with water as suggested by the distributor. That dilution may also be affected by the lab testing which is done.

The compositions described in the copending application incorporated herein by reference will ion exchange with the barium or strontium sulfate such that the barium or strontium cations are sequestered by the compositions. Because the reaction with said preferred compositions is an ion exchange, no metals will precipitate out of the spent chemicals. With the preferred chemicals incorporated by reference to the applicant's copending application, the treating fluid when maintained at >140° F. provides optimal ion exchange between the treating fluid and the scale to be treated. As stated above, the amount of time the solids need to be in contact with the fluid in the fluid contact zone is dependent upon the chemicals used and the selected level of radioactivity desired for the solids upon completion of the treatment.

As can be seen from the detailed description, until treatment of the solids is complete, the solids separation equipment is not in use. Therefore, another application of this invention would be to have two fluid contact zones treating solids at the same time, with staggered starts, so that as one treatment is being completed in the fluid contact zone those solids may be separated while the other fluid contact zone continues treatment. Once the solids are separated from the first fluid contact zone, that fluid contact zone may be reloaded with solids and treatment chemical while the second fluid contact zone is emptied to the solid separation equipment. This addition to the method of the present invention is advantageous because generally the cost of the chemical is relatively inexpensive in relation to the cost of the equipment and personnel on site to run the process. As such, steps to optimize the percentage of time that all equipment is in operation will facilitate a lower treatment cost.

In another embodiment of the present invention, pre-treatment steps may be utilized to attempt to increase the effectiveness of the later treatment, which has been described in detail previously. Prior to placing the contaminated solids in contact with the treating fluid, the contaminates are washed with a mixture of chemicals and water to remove hydrocarbons and preferentially water-wet the contaminated solids for efficient dissolution in subsequent steps. The pre-wash includes three distinct steps which utilize three different chemical solutions.

The first pre-wash step uses a chemical composition of 9.5 mole EO Nonyl Phenol at approximately 26.7% of the mixture, 6.0 mole EO Nonyl Phenol at approximately 4.9%, Ethylene Glycol MonoButyl Ether(EGMBE) at approximately 12.6%, KOH(50% solution) at approximately 4.3%, and $H_2O$ at approximately 51.5%. The chemical mixture is the diluted or mixed with water so that the final mixture includes approximately 2.5–5% of the chemical composition just described, and approximately 95–97.5% $H_2O$. The chemical composition of the preferred embodiment is offered by AMBAR, Inc., the assignee of the present invention, under the trade name AMBAR PRE-WASH.

The second pre-wash step utilizes a chemical composition of Phosphate Ester at approximately 30% of the mixture, and EGMBE at approximately 70%. The chemical mixture is diluted or mixed with water so that the final mixture includes approximately 1–5% of the chemical composition just described and approximately 95–99% $H_2O$. The chemical composition of the preferred embodiment is offered by AMBAR, Inc., the assignee of the present invention, under the trade name AMBAR PAR-KLEEN.

The third pre-wash step utilizes EGMBE mixed in $H_2O$ in the approximate mix of 5% EGMBE and 95% $H_2O$. EGMBE is offered by AMBAR, Inc., the assignee of the present invention, under the trade name AMBAR EB.

Each of the pre-wash steps of the preferred embodiment is performed in a fluid contact zone which provides for continuos agitation of the contaminated solids and the pre-wash solutions described above. Preferably, a shearing mechanism is also utilized to break apart clumps of the contaminated solids. The fluid contact zone and shearing mechanism described previously are preferably used for the pre-wash steps. However substitution of other well known mixing devices and shearing mechanisms would also be applicable. Each of the pre-wash steps should allow the pre-wash solution for that particular step to contact the contaminated solids for approximately two hours or until solids appear oil and/or hydrocarbon free and water-wet.

After the pre-wash steps an optional conversion step may be utilized. If testing of the contaminated solids reveals that those solids contain more than 5% by weight of $CaSO_4$, then a conversion step to convert acid insoluble $CaSO_4$ to an acid soluble compound is preferably performed. Solids removed from the final pre-wash step are then contacted with a converting solution for approximately 24 hours in the same or different fluid contact zone. The converting solution and contaminated solids should be agitated for the approximately 24 hour conversion process. The conversion solution is made up of approximately 46.3% $H_2O$, approximately 25.9% KOH(45% solution), approximately 1.4% sulfamic acid, approximately 0.01% RODINE 145, approximately 25.9% glycolic acid, and approximately 0.49% of the chemical composition of the first pre-wash step(AMBAR PRE-WASH). The pH of the conversion solution is adjusted using glycolic acid or KOH to approximately 7.5, prior to contacting the solution with the contaminated solids.

After the pre-wash steps, or in the alternative, after the conversion step if that step was utilized, an acid wash step is utilized to remove all acid soluble compounds. The solids are first separated from the solution used for either the pre-wash or conversion steps. The solids may remain in the fluid contact zone used in the preceding step. Acid is then added to the contaminated solids. The preferred make-up of the acid is approximately 31.5% HCL, approximately 0.0001% RODINE 213, and the remaining fluid being H2O. The chemical composition of the preferred acid is offered by AMBAR, Inc., the assignee of the present invention, under the trade name AMBAR ACID. The solids are reacted with the acid for approximately 2–4 hours, or until the acid soluble materials are dissolved. The mixture is preferably agitated either through physical mixing or pumping action as described previously. The acid is decanted. The residual acid remaining with the contaminated solids is neutralized with KOH until a pH of approximately 9.0 is reached.

After the acid wash step is completed the treatment of the contaminated solids is initiated utilizing the described method and apparatus of the present invention as described in detail previously.

EXAMPLE 1

In a field test, the preferred embodiment of FIG. 1 of the present invention was utilized to treat approximately 200 drums of contaminated sand which had radioactivity readings ranging up to 560 μR/hr. Generally, the scale contaminating the sand consisted of barium sulfate and as such the basic chemical discussed above with isotopes A and B removed from the sodium glucoheptonate was used. However, for some of the drums, there appeared to be excessive paraffin so some of the AMBASOL KFL product, which includes a sodium base, was also added to the treatment.

For the field trial, the mixing tank had a volume of approximately 120 barrels. Sixty barrels of treating fluid at a dilution of 30 barrels of stock fluid as described in the copending application and 30 barrels of fresh water were used to treat 60 barrels of contaminated solids at any given time. The target radiation level for the field test was selected to be 15 μR/hr. On average, it took two hours for the solids to reach the target level of 15 μR/hr. Once the solids reached the target level, the solids were separated and the treating fluid was returned to the mixing tank.

The same 60 barrels of treating fluid were used to treat the approximately 200 drums of contaminated solids, with no indication that the treating fluid was become spent.

Figure 2:
FIGS. 2, 3, 5, 6, 7, 9, 10, 11 and 12 are scanning electron microscope photographs of sand particles before and after treatment.
Figure 3:
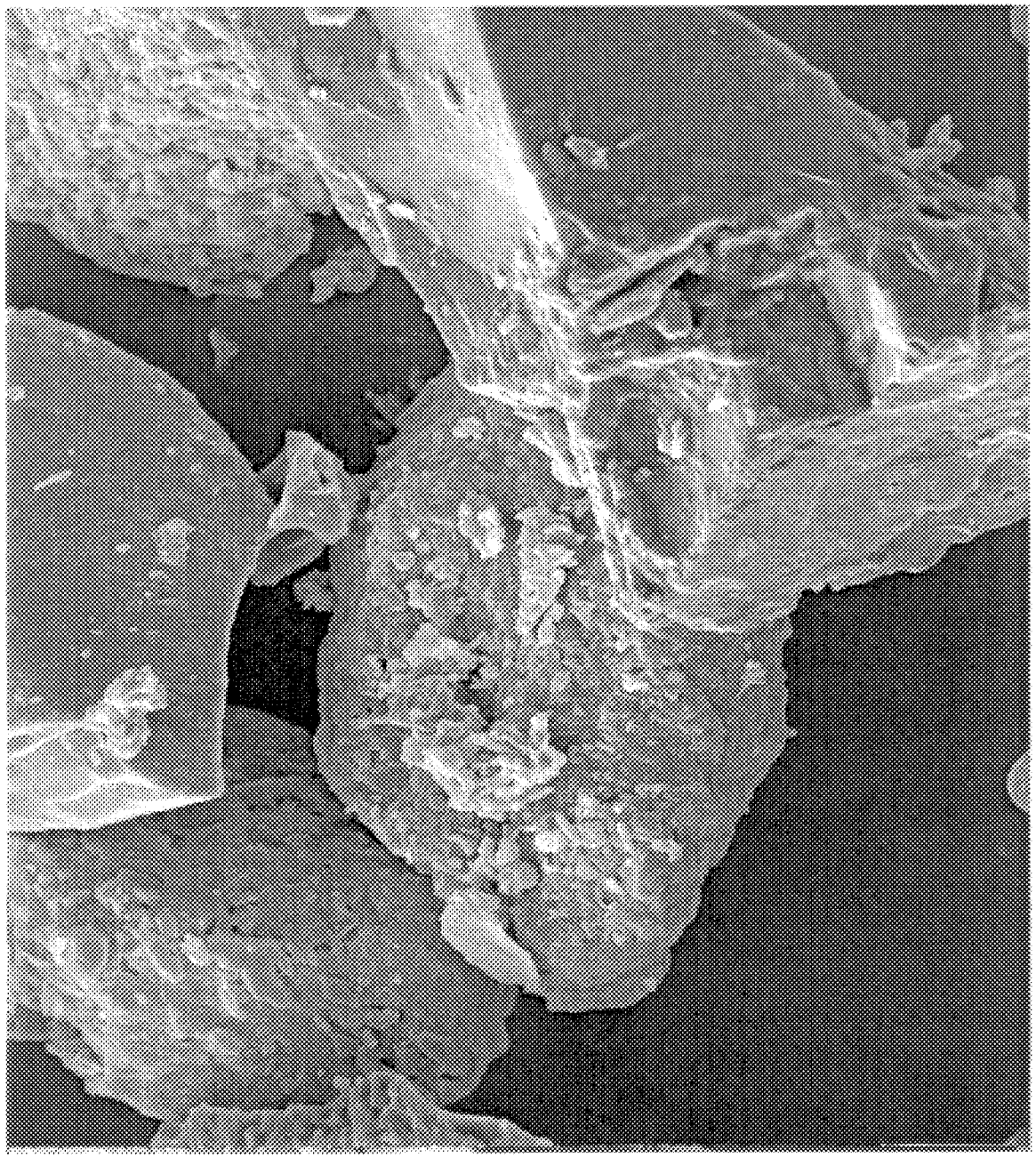
Figure 4:
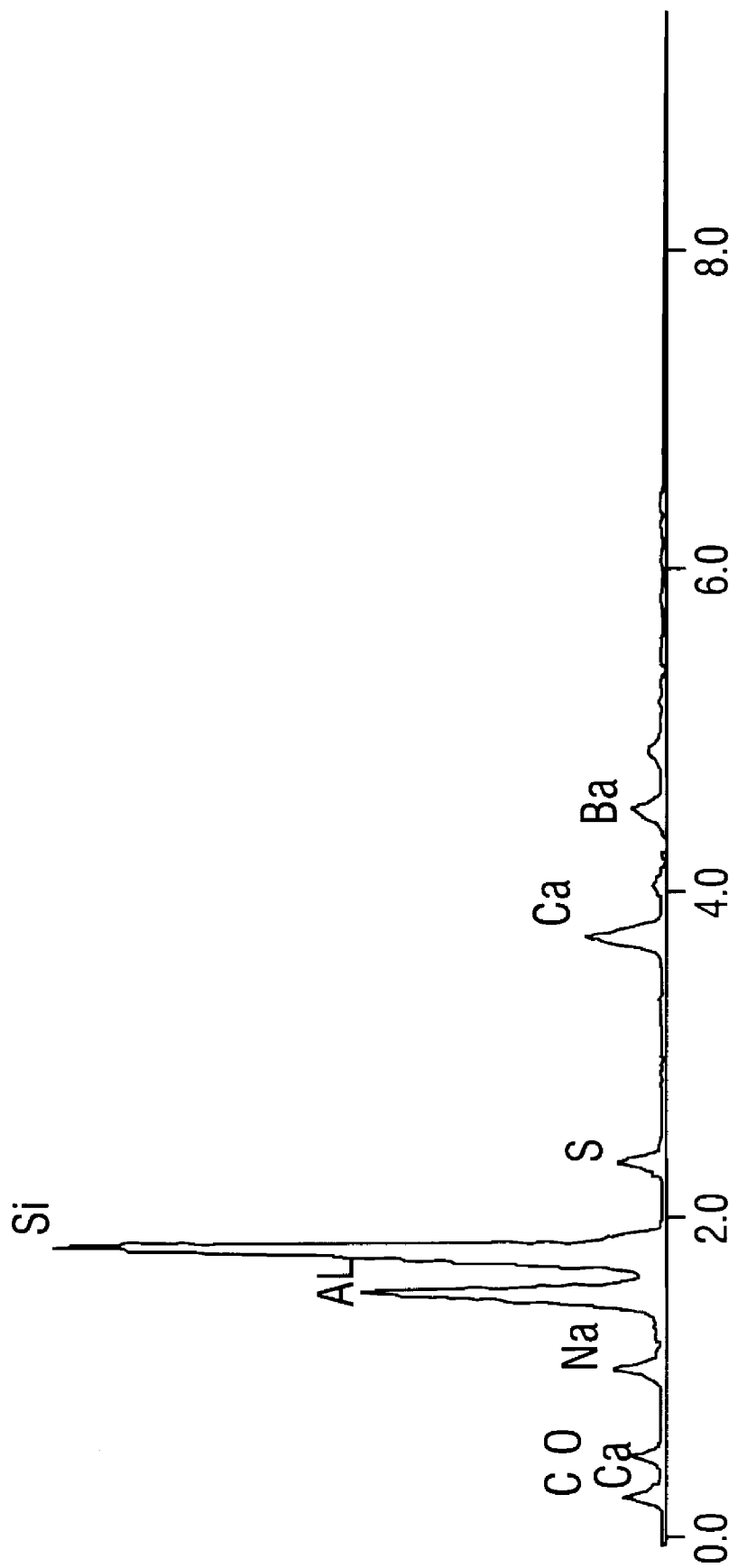
FIG. 4, 8, and 13 are x-ray defraction printouts indicating elements contained in the samples tested.
Figure 5:
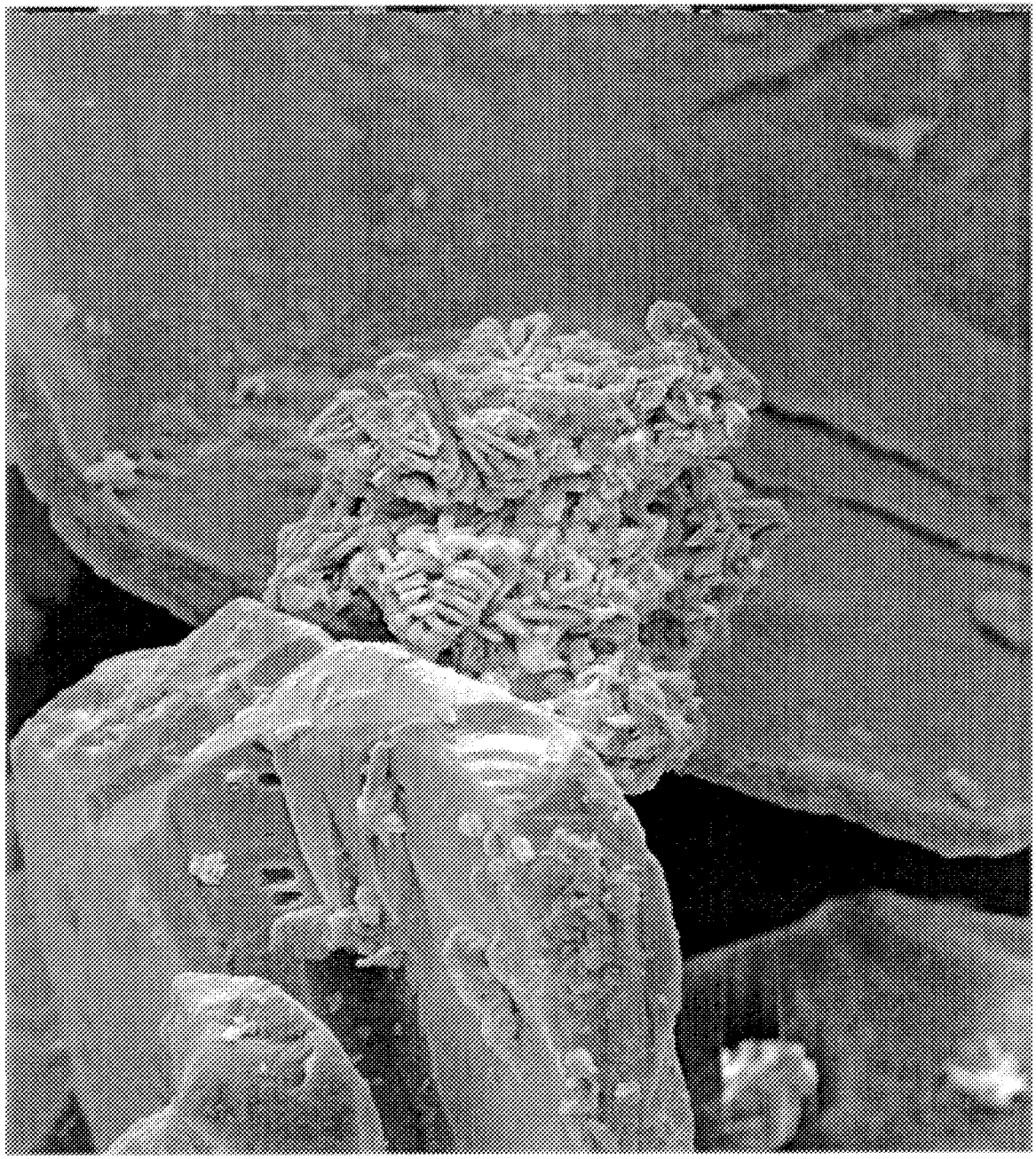
Figure 6:
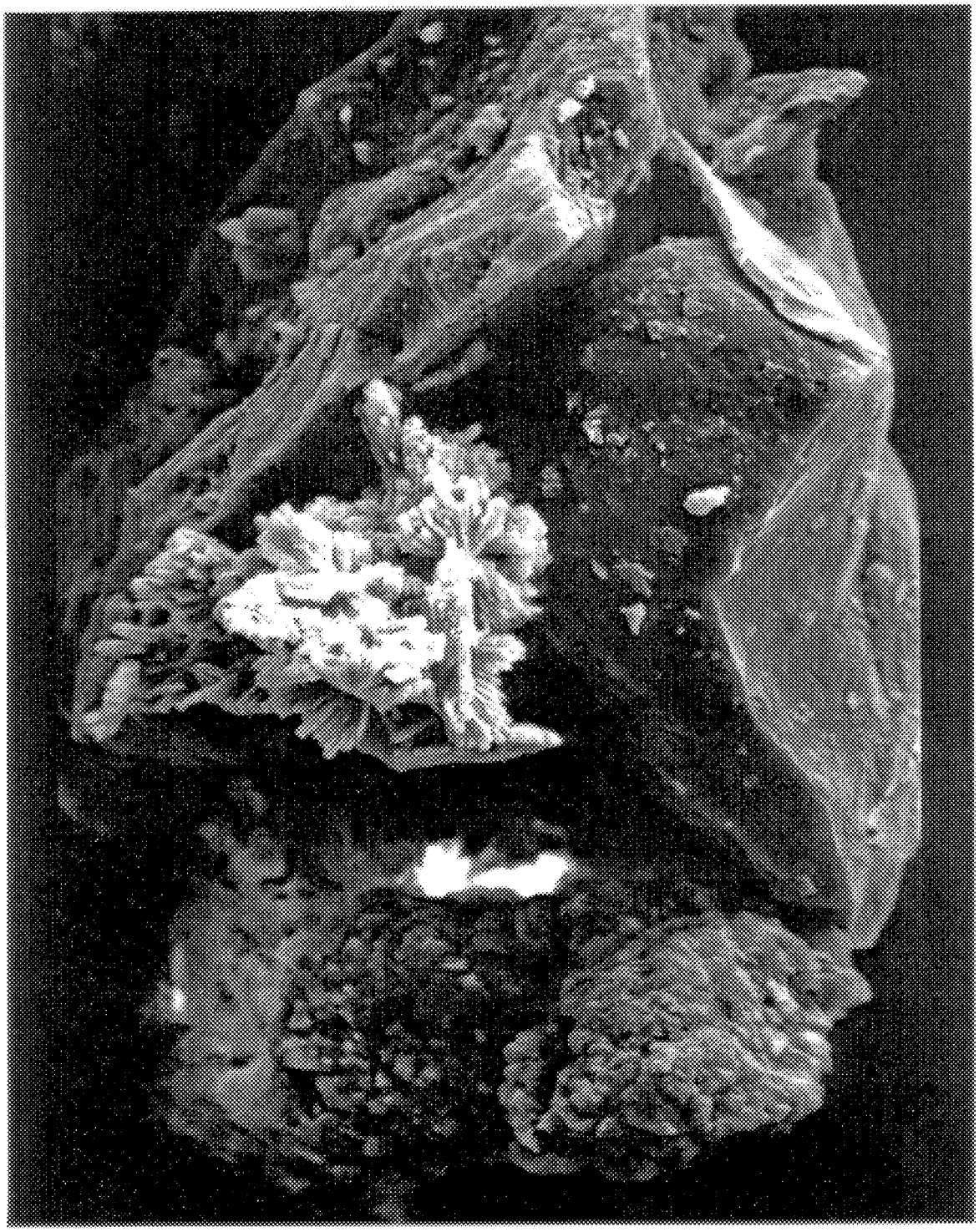
Figure 7:
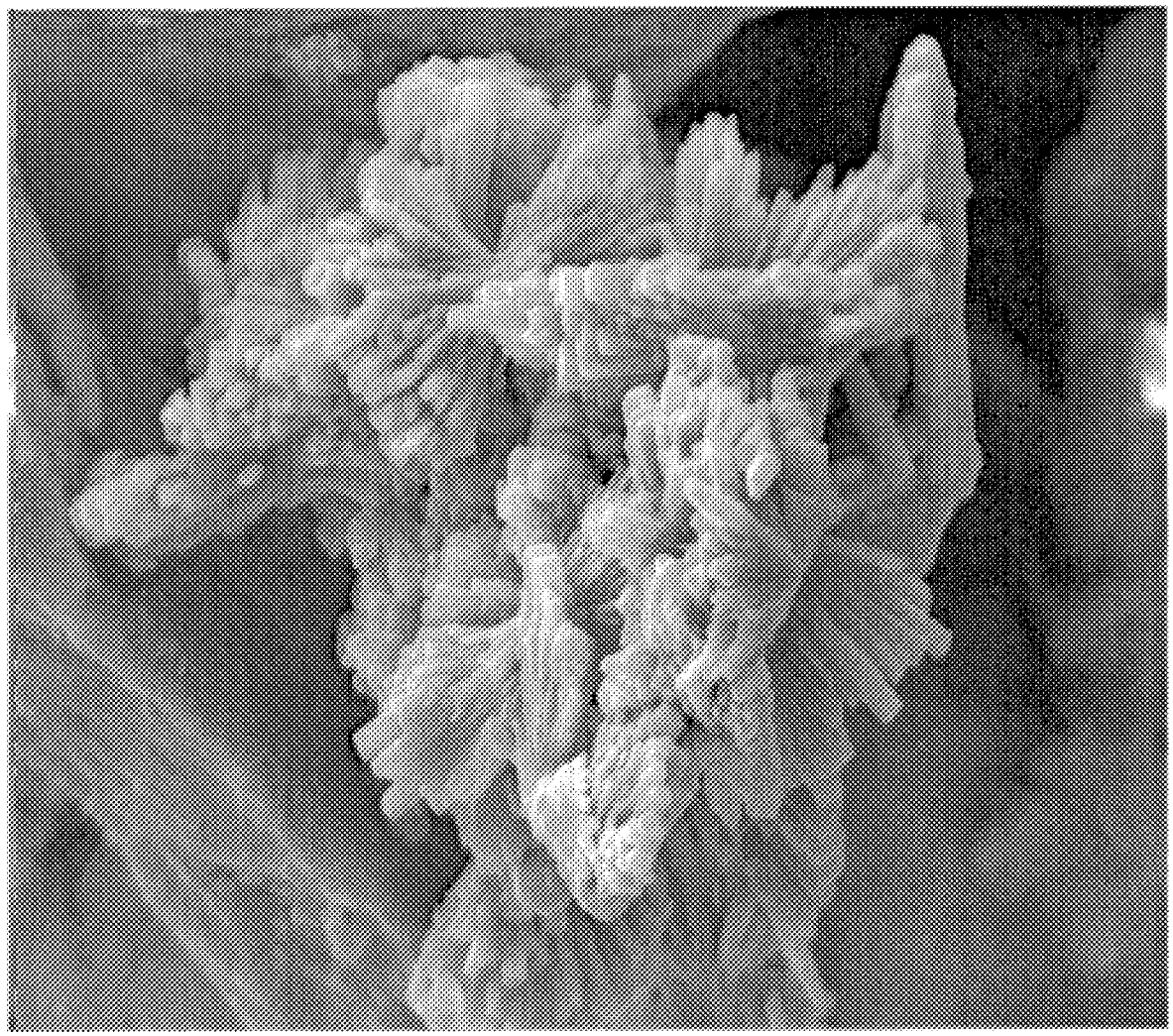
Figure 8:
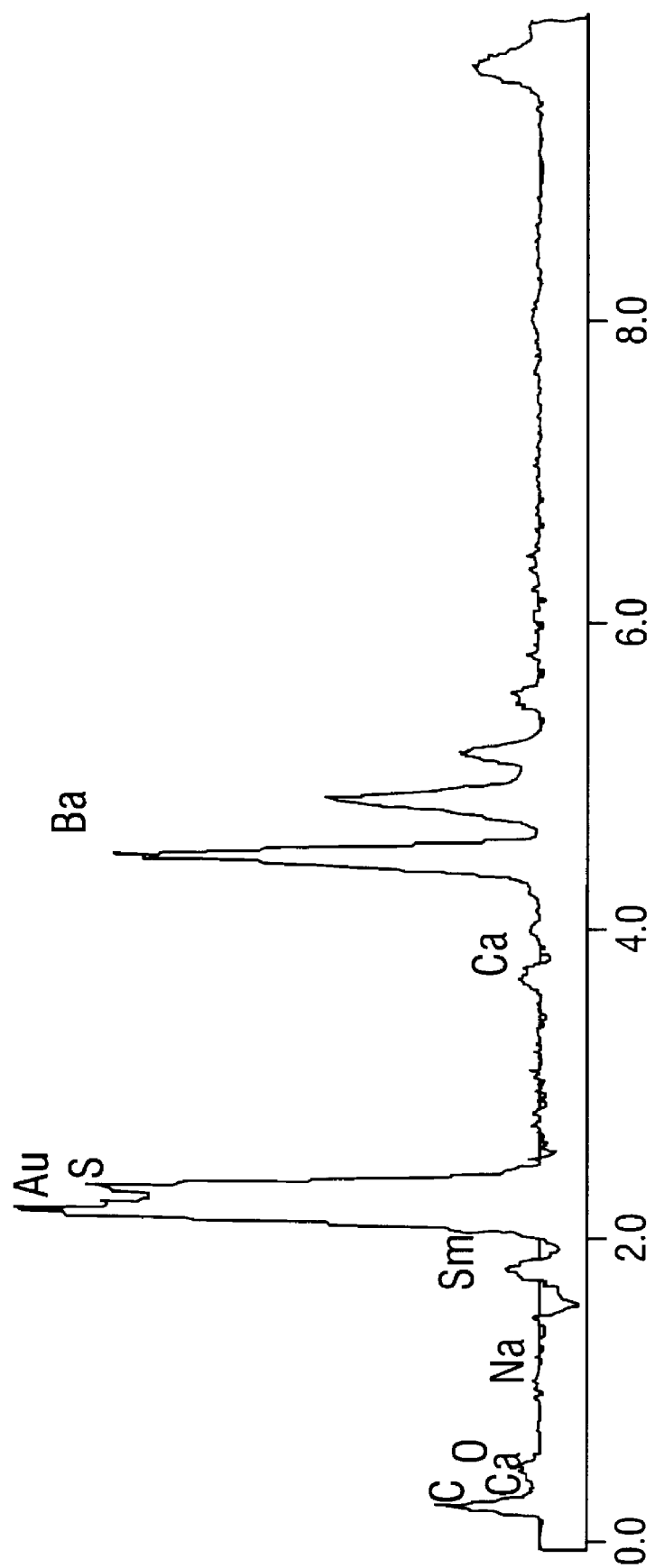
Figure 9:
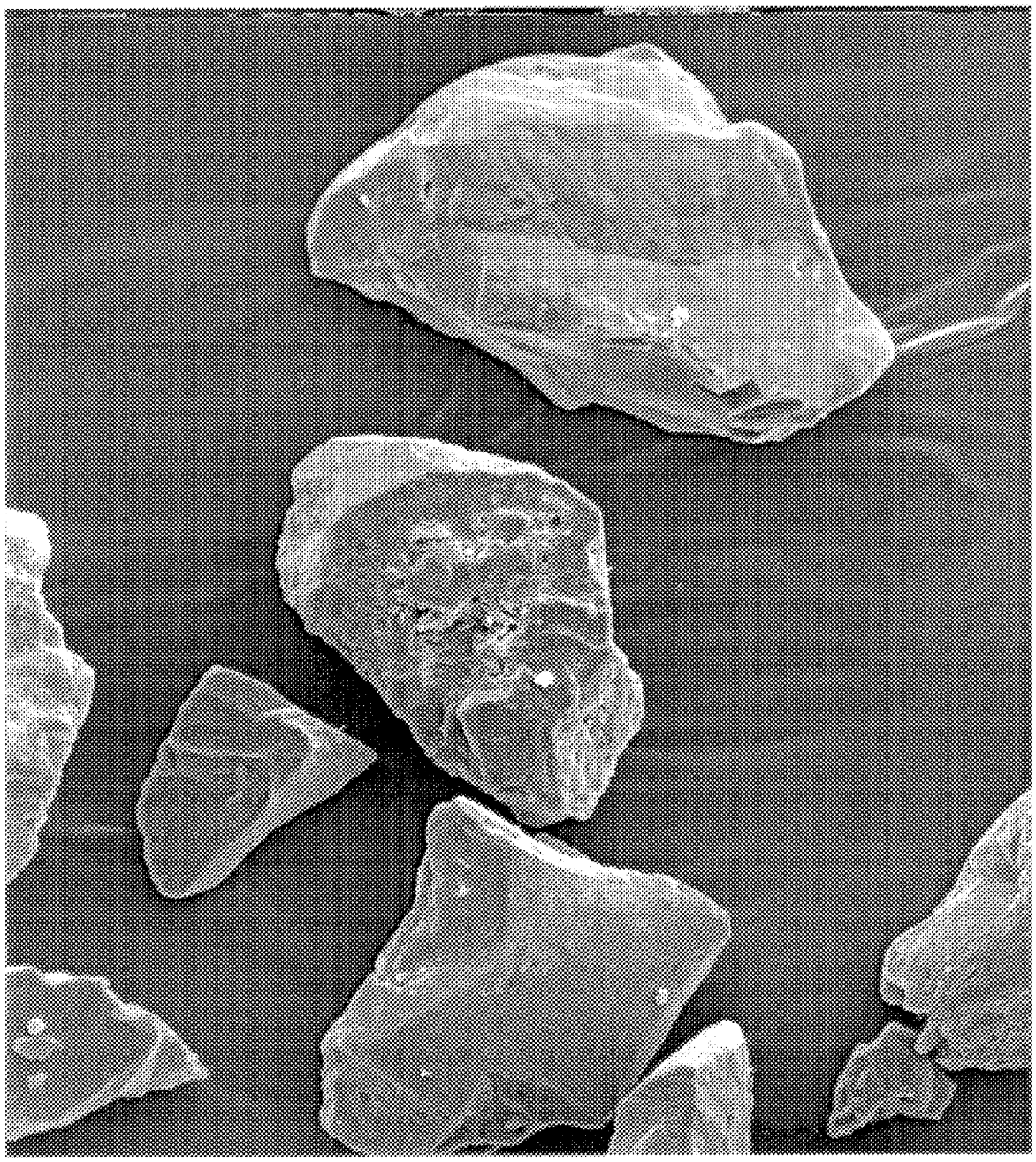
Figure 10:
Figure 11:
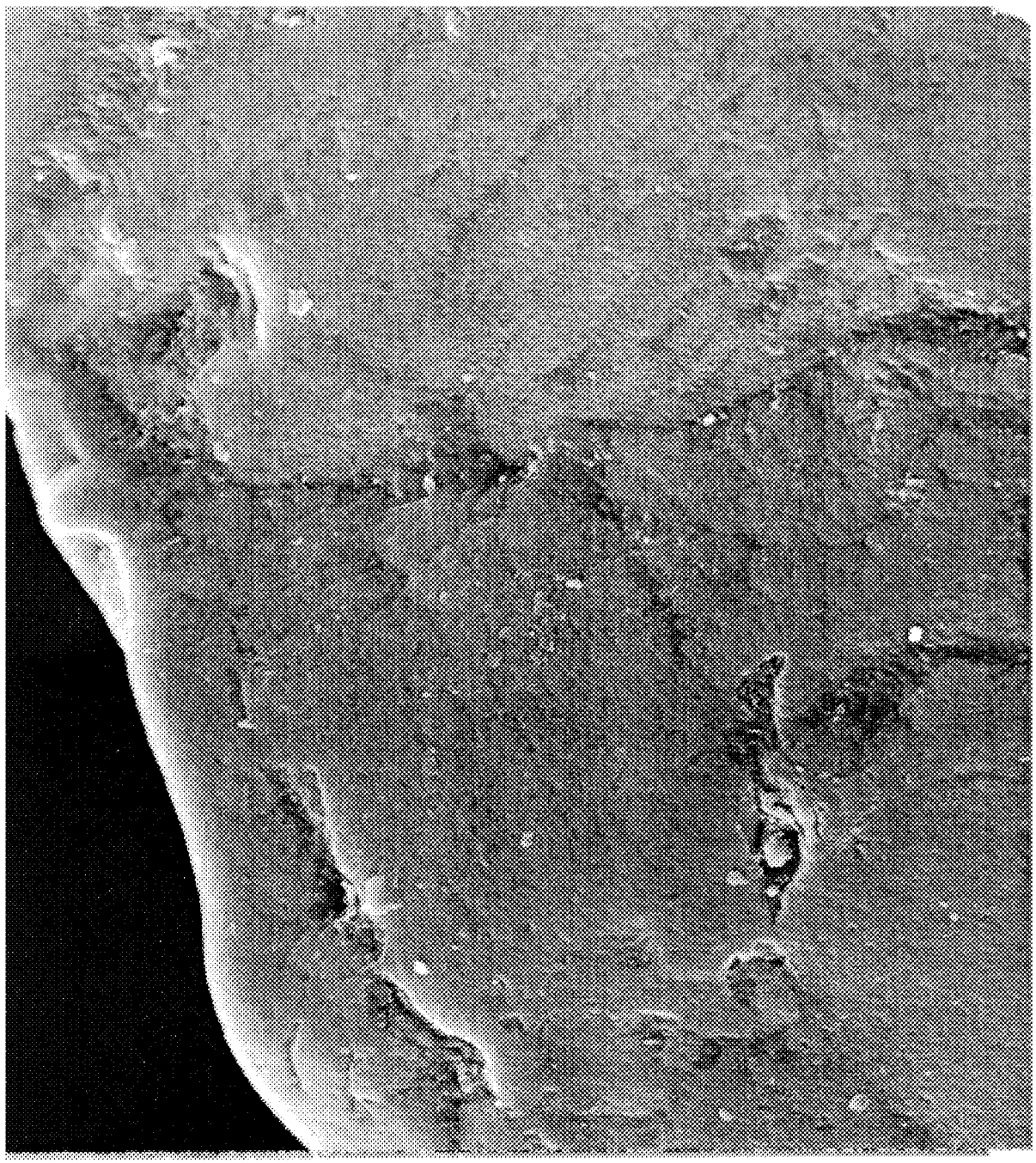
Figure 12:
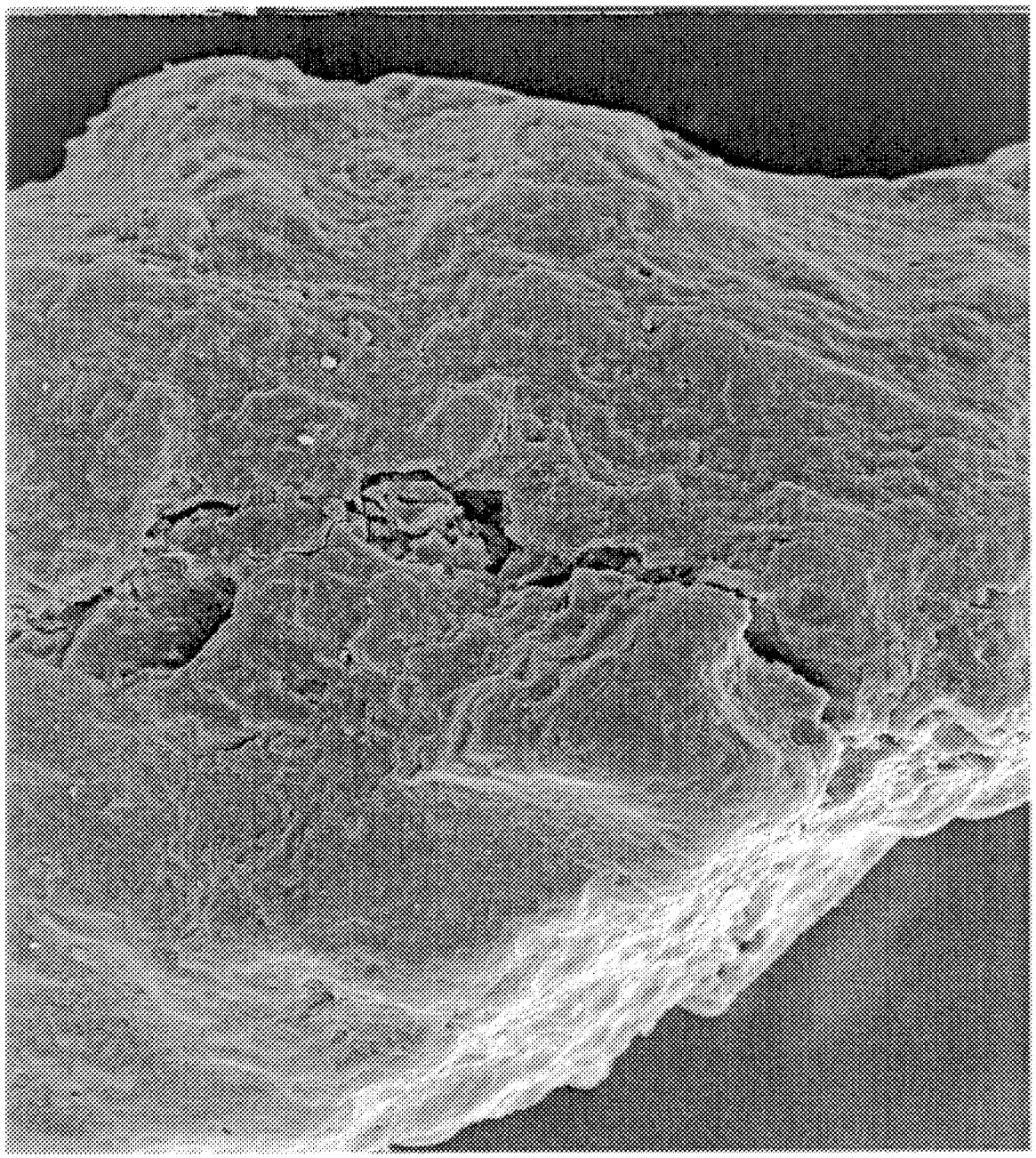

Scanning electronic microscopic testing was performed both before and after the apparatus and process of the present invention were used in the field trial. FIGS. 2 and 3 show actual electron microscope photos of sand particles before treatment which are shown by the darker gray with white barium sulfate and calcium carbonate blossoms attached to those sand particles. FIG. 4 is an x-ray diffraction reading showing the amounts of metal cations which were found in the sample before treatment. FIG. 4 indicates that there was calcium carbonate and barium sulfate included along with the silica sand particles. FIGS. 5 and 6 are also electron microscope photos of sand particles taken before treatment, in this instance showing a very large barium sulfate blossom. FIG. 7 is a closeup photo of the large barium sulfate blossom. FIG. 8 is an x-ray diffraction reading of the sample shown in FIGS. 5, 6, and 7 indicating large amounts of barium, some strontium and some calcium.

Figure 13:
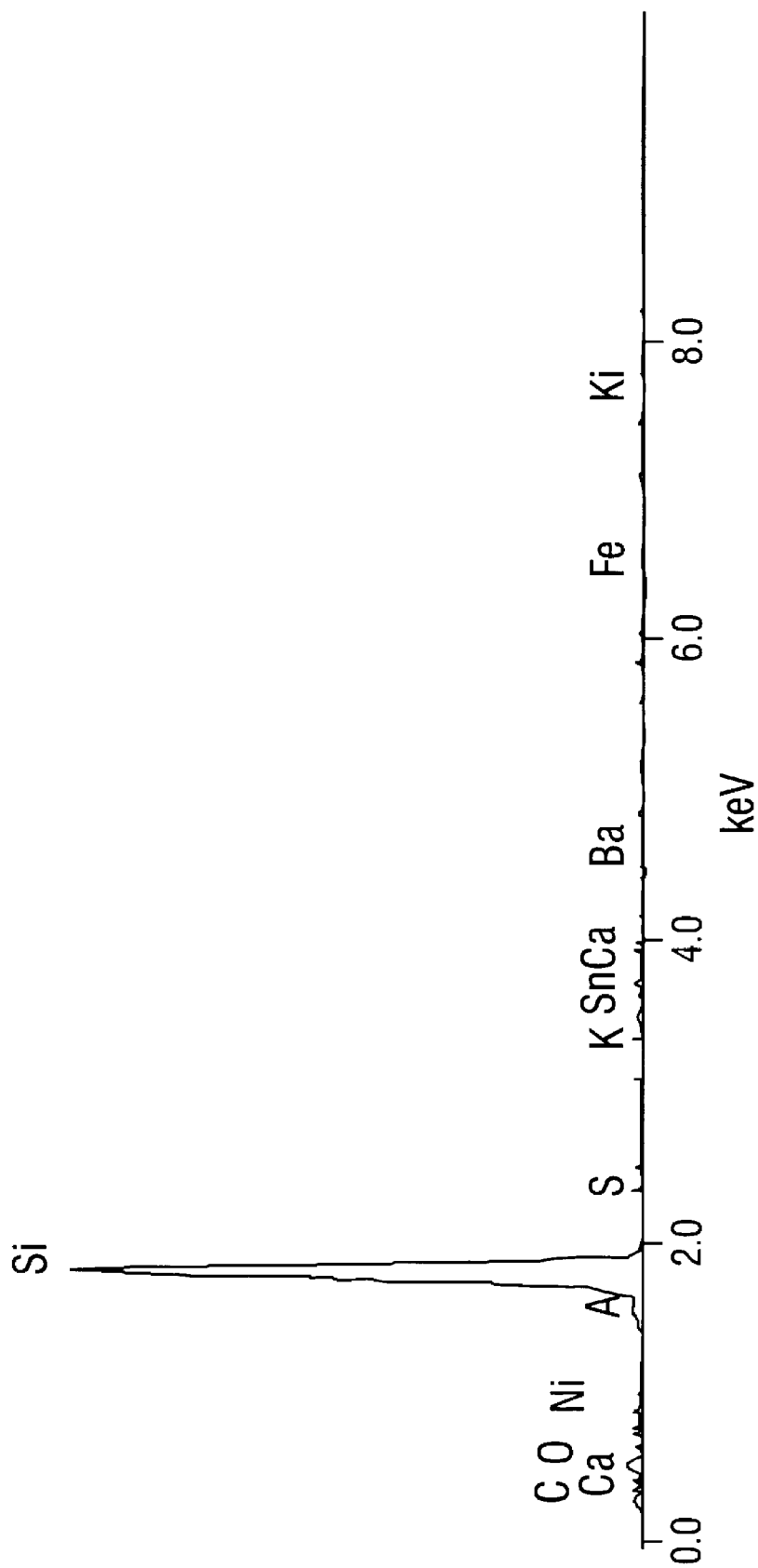

After treatment, using the preferred apparatus shown in FIG. 1 and described above, the solids were once again subjected to scanning electron microscope study. FIGS. 9, 10, 11 and 12, show sand particles with only tiny white scale particles remaining. The x-ray diffraction of the treated solids is shown in FIG. 13 where, as can be seen, all that is basically left is silica sand with effectively no trace of barium or strontium.

What is claimed:

1. A process for treating surface stored contaminated solids which are contaminated with alkaline earth metal or silica based scales which have entrained naturally occurring radioactive material, comprising:

performing a pre-wash treatment to remove hydrocarbon material from the contaminated solids;

performing an acidizing step to acidize acid soluble material from the contaminated solids;

transferring said contaminated solids into a fluid contact zone;

contacting, in said contact zone, said contaminated solids with a treatment fluid capable of causing said entrained naturally occurring radioactive material to be released from the scale;

agitating said treatment fluid in said contact zone to suspend said contaminated solids in said treatment fluid;

heating said treatment fluid to a temperature high enough to increase chemical reaction, and maintaining said temperature of said treatment fluid throughout the time said contaminated solids are in said contact zone;

shearing said contaminated solids that are in contact with said treatment fluid to increase the surface area of said contaminated solids that are in contact with said treatment fluid;

determining the level of radioactivity of the solids being contacted in said contact zone through sampling, and if the level of activity has reached a preselected level of activity, then separating said solids from said treatment fluid.

2. The process of claim 1 further including a conversion step following the pre-wash treatment to convert $CaSO_4$ to acid soluble material.

3. A process for treating surface stored contaminated solids which are contaminated with alkaline earth metal or silica scales which have entrained naturally occurring radioactive material, to reduce the radiation level of said contaminated solids to a selected level comprising:

performing lab tests on said contaminated solids to determine the optimum treating fluid and the concentration of said treating fluid to be used;

selecting a treating fluid based on said step of performing lab tests, said selected treating fluid comprising a polyaminocarboxylic acid, a potassium base, water, a pH stabilizer in the form of a potassium salt, a synergist comprised of a hydroxy-carboxylic acid or salt thereof, and a wetting agent comprising methanol and sodium chloride;

performing a pre-wash treatment to remove hydrocarbon material from the contaminated solids;

performing an acidizing step to acidize acid soluble material from the contaminated solids;

placing said contaminated solids in a fluid contact zone where the selected treating fluid may be contacted with said solids;

agitating said selected treating fluid in said fluid contact zone to suspend said solids in said selected treating fluid;

heating said selected treating fluid to a temperature high enough to promote optimal chemical reaction and maintaining said temperature of said treating fluid throughout the time solids are in contact with said selected treating fluid;

shearing the solids that are in contact with said selected treating fluid to break up said solids to increase the surface area of said solids that is in contact with said selected treating fluid;

sampling said solids in said fluid contact zone to determine whether said selected radiation level has been reached; and separating said solids from said selected treating fluid when said selected radiation level has been reached.

4. The process of claim 3 wherein said step of performing lab tests also includes testing the contaminated solids to determine the percentage by weight of $CaSO_4$ that is present.

5. The process of claim 4 further including a conversion step following the pre-wash treatment to convert $CaSO_4$ to acid soluble material, if said lab tests determine that greater than approximately 5% by weight of $CaSO_4$ is present in the contaminated solids.

* * * * *

UNITED STATES PATENT AND TRADEMARK OFFICE
CERTIFICATE OF CORRECTION

PATENT NO. : 5,824,159

DATED : OCTOBER 20, 1998

INVENTOR(S) : ROBERT D. TATE/JAMES D. ORUM

It is certified that error appears in the above-identified patent and that said Letters Patent is hereby corrected as shown below:

Title page, item [75] insert --James D. Orum-- as co-inventor.

Signed and Sealed this

Twenty-third Day of February, 1999

Attest:

Q. TODD DICKINSON

Attesting Officer     Acting Commissioner of Patents and Trademarks